Dec. 15, 1959     L. R. MITTANCK     2,916,823
CATTLE DEHORNING IMPLEMENT
Filed Sept. 24, 1958
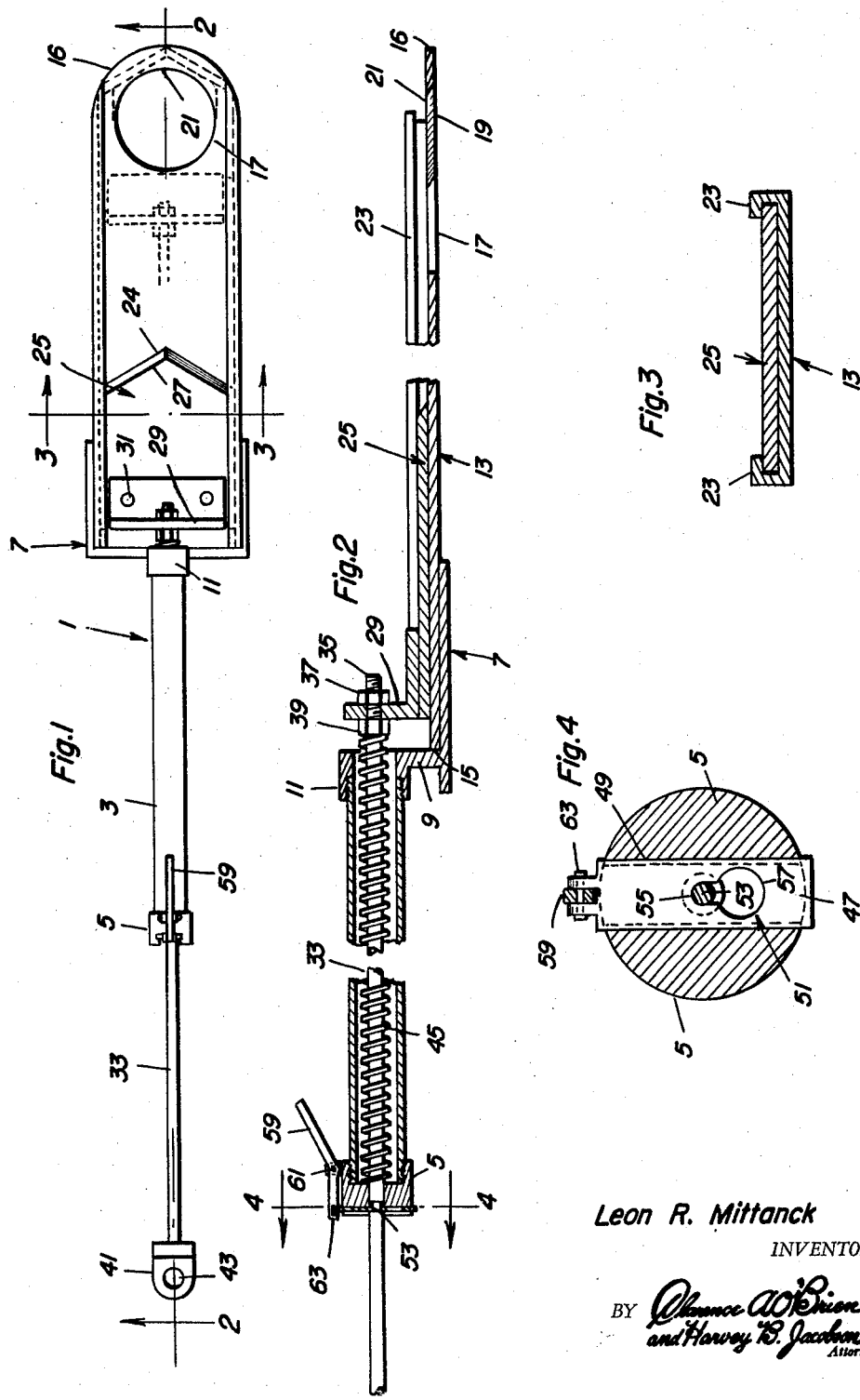
Leon R. Mittanck
INVENTOR.

United States Patent Office 2,916,823
Patented Dec. 15, 1959

2,916,823

CATTLE DEHORNING IMPLEMENT

Leon R. Mittanck, Bellville, Tex.

Application September 24, 1958, Serial No. 763,094

1 Claim. (Cl. 30—241)

This invention relates to improvements in cattle dehorning implements of the clippers-type.

The primary object of the invention is to provide an implement for quickly dehorning cattle without completely restraining the cattle.

Another object is to provide an implement for the above purpose which is spring operated under trigger control from a cocked position.

Still another object is to provide an implement as in the foregoing which is safe and easy to use, durable and of simple inexpensive construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in plan of the implement;

Figure 2 is an enlarged fragmentary view in longitudinal section taken on the line 2—2 of Figure 1 and partly broken away;

Figure 3 is an enlarged view in cross-section taken on the line 3—3 of Figure 1, and Figure 4 is an enlarged view in cross-section taken on the line 4—4 of Figure 2.

Referring to the drawing by numerals, the dehorning implement of this invention and which is designated, as a unit, by the numeral 1 comprises a tubular handle 3 having an axially apertured, butt end closure cap 5 threaded thereon. A head plate 7, for a purpose presently described, is provided at the front end of the handle 3 and is downwardly offset therefrom and extends forwardly thereof and parallel thereto. The head plate 7 is attached to the handle 3 by means of an upstanding flange 9 thereon terminating in a sleeve 11 threaded onto the front end of said handle 3.

A relatively fixed cutter blade 13 of elongated rectangular shape is welded, as at 15, on top of the head plate 7 and extends lengthwise forwardly thereof parallel therewith. The cutter blade 13 is provided with a free front, rounded, end 16 having a circular aperture 17 therein which is provided with a front, beveled half section 19 forming a substantially semi-circular cutter edge 21 on the top face of said blade 13. The aperture 13 is of a diameter to fit over a horn of average cattle and loosely around the base of the horn. The fixed cutter blade 13 is provided on its top face with a pair of longitudinal, side, edge channel guides 23 with channels confronting and for a purpose presently seen.

An elongated rectangular, movable cutter blade 25 is supported on top of the fixed cutter blade 13 and slidable endwise in the guides 23 for advance over the aperture 17 from a retracted position in which it is spaced substantially in the rear of said aperture 17. The movable cutter blade 25 is provided with an obtuse angled convex front end 27 beveled downwardly to form an obtuse angled forwardly extending convex cutting edge 24 on the bottom of said movable blade 25. The movable cutter blade 25 is provided with an upstanding butt end apertured, flange 29 riveted thereon as at 31.

The movable blade 25 is operative to advance and retract the same by means of a pull rod 33, extending through the sleeve 11, handle 3 and cap 5 and having a front end 35 extended through the flange 29 and secured thereto by front and rear nuts 37, 39 threaded on said end 35 at opposite sides of said flange 29. A hand grip 41 is provided on the butt end of the pull rod 33 and suitably apertured as at 43 for use in hanging the implement on a nail or the like.

A helical tension spring 45 in the handle 3 and on the pull rod 33 bears at its ends against the cap 5 and the rear nut 37 and thereby acts to advance the pull rod 33 and the movable blade 25.

Trigger means is provided for releasably holding the movable cutter blade 25 in retracted position and comprises the following. A latch bar 47 is longitudinally slidably mounted in a diametrical guide groove 49 in the back of the cap 5 for movement in opposite directions into latching and unlatching positions respectively. The latch bar 47 is provided with a central keyhole slot 51 thereon through which the pull rod 33 extends. A circumferential groove 53 in the pull rod 33 is engaged in the smaller end 55 of the slot 51 in retracted position of the movable blade 25 and the latching position of said bar 47 and thereby latches the movable blade 25 in the retracted tensioned cocked position. Movement of the latch bar 47 into unlatching position disengages the smaller end 55 of the slot 51 from the groove 53 and permits the pull rod 33 to move freely in the larger end 57 of the slot 51 so that the pull rod 33 and blade 25 are projected by the spring 45 until the hand grip 41 engages said latch bar 47 and stops projection of said rod 41 and blade 25.

A trigger lever 59 for operating the latch bar 47 is pivoted intermediate its ends as at 61, on the cap 5 and operatively terminally connected to one end of the latch bar 47 as at 63. As will be understood operation of the lever 59 in opposite directions slides the latch bar 47 into latching and unlatching positions and when the latch bar 47 is in latching position the movable jaw 25 is cocked in retracted position.

The use and operation of the invention will be readily understood. The pull rod 33 is pulled rearwardly to slide the movable cutter blade 25 into the retracted position shown in full lines in Figures 1 and 2. In this position the groove 53 in said rod 33 registers with the latch plate 47 which may then be operated by the trigger lever 59 into latching position shown in Figures 2 and 4 to hold the pull rod 33 and movable cutter plate 25 in cocked position. The implement may then be manipulated to insert a horn, not shown of a steer cow or the like through the aperture 17 with the fixed blade 19 substantially at a right angle to the horn and at the base thereof. Then the latch plate 47 is released into unlatching position by manipulation of the trigger lever 59 whereupon, the spring 45 which was tightly compressed when the pull rod 33 was retracted, will expand to quickly advance the pull rod 33 and the movable blade 25 so that the cutting edge 24 of the movable blade 25 will coact with the cutting edge 21 of the fixed blade 13 to cut off the horn with a clipping action. If desired the trigger lever 59 may be suitably loaded by a tension spring, not shown, for operating the latch plate 47 into latching position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a cattle dehorning implement, a handle having a rear and a front end, a fixed cutter blade having a sharp edged aperture therein for receiving a horn of cattle, means mounting said fixed cutter blade on the front end of the handle to extend forwardly of said handle, a movable cutter blade on said fixed blade slidably mounted thereon for advance and retraction relative to said aperture and having a front edge coacting with the sharp edge of said aperture in response to advance of the movable cutter blade to cut off a horn received in said aperture, a pull rod slidably connected to said handle and fixed to said movable blade to retract said movable blade and movable rearwardly and forwardly to retract and advance said movable blade, spring means operatively connected to said handle and said movable blade to advance the movable blade, a latch bar for said pull rod transverse thereto and slidably mounted on said rear end for movement into latching and unlatching positions respectively, and having a keyhole slot therein through which the pull rod extends, a circumferential groove in said pull rod engaged and disengaged with said bar at said slot in the latching and unlatching positions of said bar respectively, and a hand lever pivoted on said handle and to said bar for moving said bar.

References Cited in the file of this patent

UNITED STATES PATENTS

| | | |
|---|---|---|
| 503,617 | Rader | Aug. 22, 1893 |
| 507,792 | Denham | Oct. 31, 1893 |
| 720,706 | Lamb | Feb. 17, 1903 |
| 727,263 | Barrett | May 5, 1903 |
| 1,010,817 | Strong | Dec. 5, 1911 |
| 1,090,317 | Lindstrom | Mar. 17, 1914 |
| 1,120,473 | Goodwin | Dec. 8, 1914 |
| 2,764,813 | Hoffman | Oct. 2, 1956 |
| 2,766,525 | Hoffman | Oct. 16, 1956 |